United States Patent
Moore et al.

(10) Patent No.: US 7,900,212 B2
(45) Date of Patent: *Mar. 1, 2011

(54) POOLING STATEFUL SESSION ENTERPRISE JAVA BEANS FOR REUSE

(75) Inventors: Victor S. Moore, Boynton Beach, FL (US); Wendi L. Nusbickel, Boca Raton, FL (US); Ricardo Dos Santos, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 352 days.

This patent is subject to a terminal disclaimer.

(21) Appl. No.: 12/115,828

(22) Filed: May 6, 2008

(65) Prior Publication Data

US 2008/0209447 A1 Aug. 28, 2008

Related U.S. Application Data

(63) Continuation of application No. 10/833,577, filed on Apr. 28, 2004, now Pat. No. 7,389,513.

(51) Int. Cl.
  G06F 3/00 (2006.01)
  G06F 9/44 (2006.01)
  G06F 9/46 (2006.01)
  G06F 13/00 (2006.01)
(52) U.S. Cl. ..................... 719/315; 719/330
(58) Field of Classification Search .......... 719/315, 719/330
See application file for complete search history.

(56) References Cited

U.S. PATENT DOCUMENTS

| 6,581,088 | B1 | 6/2003 | Jacobs et al. |
| 7,086,065 | B1 | 8/2006 | Yeluripati et al. |
| 2002/0073397 | A1 | 6/2002 | Yoshida et al. |
| 2003/0007609 | A1 | 1/2003 | Yuen et al. |
| 2004/0049481 | A1 | 3/2004 | Blevins |

OTHER PUBLICATIONS

Richard Monson-Haefel, "Enterprise JavaBeans", Sep. 2001, O'Reily Media, Second Edition, pp. Chapter 3.*
Lee et al., "Analysis of Object Interaction during the Enterprise JavaBeans Lifecycle using Formal Specification Technique", Jun. 2002, ACM, SIGPLAN Notices, V. 37(5), pp. 82-92.*
Budi Kurniawan, "Java for the Web with Servlets, JSP, and EJB: A Developer's Guide to J2EE Solutions", Apr. 2002, Sams, pp. Chapter 29.

* cited by examiner

*Primary Examiner* — Li B Zhen
*Assistant Examiner* — KimbleAnn Verdi
(74) *Attorney, Agent, or Firm* — Novak Druce + Quigg LLP

(57) ABSTRACT

A method of interfacing with a remote engine can include the step of instantiating at least one stateful bean, such as a stateful session Enterprise Java Bean. For each stateful bean instance, an engine can be allocated. Each stateful bean instance can be associated with an allocated engine, where each stateful bean instance can operate as an interface for accessing the associated engine. Each associated stateful bean can then be added to a bean pool so that bean instances in the bean pool are available for handling requests.

7 Claims, 3 Drawing Sheets

/** Extends EJB SessionBean interface provided by container
 *   javax.ejb.SessionBean)
 **/ public interface SessionBean {
    ...

/**
     * Called by a bean container after a stateful bean instance is retrieved from the pool
     **/
    public void instanceAcquired();

/**
     * Called by the bean container to check whether this instance should be pooled
     * or not.
     * @ return true if and only if this instance should be pooled by the container.
     **/
    public boolean releaseInstance();

/**
     * Called in lieu of an ebj create method.  When at least one stateful EJB instance
     * exists within the bean pool, acquire one of the available stateful EBJs.  When no
     * stateful EJB is available within the bean pool, create a new stateful EJB instance.
     **/
    public Statefulejb acquire();

POOLING STATEFUL SESSION ENTERPRISE JAVA BEANS FOR REUSE

CROSS REFERENCE TO RELATED APPLICATIONS

This application is a continuation of, and accordingly claims the benefit from, U.S. patent application Ser. No. 10/833,577, now issued U.S. Pat. No. 7,389,513, which was filed in the U.S. Patent and Trademark Office on Apr. 28, 2004.

BACKGROUND

1. Field of the Invention

The present invention relates to the field of computer software and, more particularly, to stateful session Enterprise Java Beans.

2. Description of the Related Art

ENTERPRISE JAVA BEANS (EJB) are reusable and portable software components that model business objects and processes. EJBs can run on any EJB enterprise server compliant with the JAVA 2 ENTERPRISE EDITION (J2EE) specification. The EJB server can manage many significant overhead issues such as object persistence, security, and transaction management. There are multiple types of EJBs including entity beans, session beans, and message driven beans.

A session EJB is a reusable component that maintains conversations or sessions with clients. The creation of a session EJB can require startup overhead such as allocating sufficient memory for the EJB and initializing reference variables for the EJB. The first client to request access to a session EJB can experience a performance lag when no pre-existing EJB is available for use due to the overhead in creating a new EJB instance. This overhead can cause a delay in program execution. The resulting delay can be unacceptable in many situations, including situations where real-time and/or near real-time responses are necessary. Two types of session EJBs are stateful and stateless EJBs.

A stateful session EJB maintains a conversational state with one client for the duration of a single session. This implies that the stateful session EJB can maintain instance variables across multiple invocations from the same client during a single session. Once the client finishes interacting with the stateful session EJB, the session for the EJB ends and all state data for the stateful session EJB is discarded. Stateful session EJBs are constructed every time a client requests a bean. Notably, stateful session EJBs are not pooled for reuse, thereby causing each new client call for a stateful session EJB to experience performance delays associated with instantiating a new stateful session EJB.

A stateless session EJB does not maintain a conversational state for each individual client. When a client requests a stateless session EJB, the client receives an existing instance from a pool of previously created stateless session EJBs. If no previously created EJBs exist in the pool, a new instance is created. A stateless session EJB is removed from the pool for the duration of any method call from a client. After the method completes, the stateless session EJB is returned to the pool. The transient nature of stateless session EJBs allows an EJB container to reuse EJB instances, which may optimize performance in many situations.

Each invocation of a stateless session EJB should be considered as a request to a brand new object instance, since any instance-variable state will be lost between invocations. That is, subsequent methods invoked by the same client against the same bean are not guaranteed to be performed by the same stateless session EJB instance since the bean container randomly retrieves a free stateless session EJB from the bean pool for each invocation. Accordingly, operations that require variable state information to be maintained cannot be performed using conventional stateless session EJBs. For example, a stateless session EJB should not be used to manage a process that may have to be interrupted before completion because the variable state information required to programmatically interrupt the process will not be maintained by the stateless session EJB.

SUMMARY OF THE INVENTION

The present invention provides a method, a system, and an apparatus for creating a pool of stateful session EJBs in accordance with the inventive arrangements disclosed herein. More specifically, a bean container can be extended to manage a pool of stateful session beans. When a client requests a stateful session bean, an appropriate stateful session bean available within the pool can be provided to the client. The selected stateful bean can be marked as unavailable or marked as being removed from the pool. Once the client has finished utilizing the stateful session bean, the bean can be released back into the pool for reuse by other clients.

Consequently, the disclosed invention can be used as a solution that permits bean pooling to avoid the performance latencies associated with instantiating stateful session beans. Further, unlike techniques that utilize stateless session beans, the pooling of stateful session beans can assure that conversational states are maintained with clients that utilize the stateful session beans. Accordingly, operations not previously possible, such as interrupting called processes before process completion, can be performed using the stateful session beans. This implies that the new stateful session bean is re-entrant, meaning that more than one thread can access the stateful session bean at the same time. In other words, the stateful session bean can be thread-safe.

One aspect of the present invention can include a method of interfacing with a remote engine. The method can include the step of instantiating at least one stateful bean, such as a stateful session EJB. For each stateful bean instance, an engine can be allocated, where an engine can include a speech engine or any resource processor. Each stateful bean instance can be associated with an allocated engine, where each stateful bean instance can operate as an interface for accessing the associated engine. Each associated stateful bean can then be added to a bean pool so that bean instances in the bean pool are available for handling requests.

It should be noted that this invention can be implemented as a program for controlling a computer to implement the functions described herein, or a program for enabling a computer to perform the process corresponding to each step of the method presented herein. This program may be provided by storing the program in a magnetic disk, an optical disk, a semiconductor memory, any other recording medium, or distributed via a network.

Another aspect of the present invention can include an application server interfacing system. The system can include at least one engine configured to process requests for the application server. The system can also include a bean container configured to manage at least one stateful bean. The bean container can include a bean pool. The bean pool can contain a multitude of stateful bean instances that are available for use upon demand. Each of the stateful bean instances can operate as an interface for accessing an engine, which has been associated with the stateful bean instance.

BRIEF DESCRIPTION OF THE DRAWINGS

There are shown in the drawings, embodiments that are presently preferred; it being understood, however, that the invention is not limited to the precise arrangements and instrumentalities shown.

FIG. 3 is expository pseudo-code for implementing a pool of stateful session EJBs in accordance with the inventive arrangements disclosed herein.

DETAILED DESCRIPTION OF THE INVENTION

The present invention discloses a technique for pre-loading a multitude of stateful session EJBs into an EJB container, thereby establishing a "free" pool of available stateful session EJBs. Each of the stateful session EJBs can be used as an interface between an application server and a remote resource. When a process triggered by the interface bean is running, the stateful session EJB can be removed from the pool and considered unavailable. When the process within the remote resource has finished or is terminated, the stateful session EJB can be released back to the pool, thereby making the EJB available for handling other request.

The preloading technique alleviates the problem of performance latency typically suffered when instantiating a new EJB. The performance latency normally results from initial set-up costs for instantiating EJBs, initializing a remote resource, and/or establishing communications between the EJBs and the associated resource. In embodiments where real time and near-real time responses are expected, such as telephony and/or voice services, performance latencies can be highly problematic. The embodiments disclosed herein address these issues.

The utilization of stateful session EJBs as a resource interface allows for state-related data to be retained by the EJB as the resource processes requests. Retaining state information allows an application client to interrupt a remote resource process before the process completes. Interrupting requests before completion can facilitate asynchronous interfacing with the remote resources.

Figure 1:
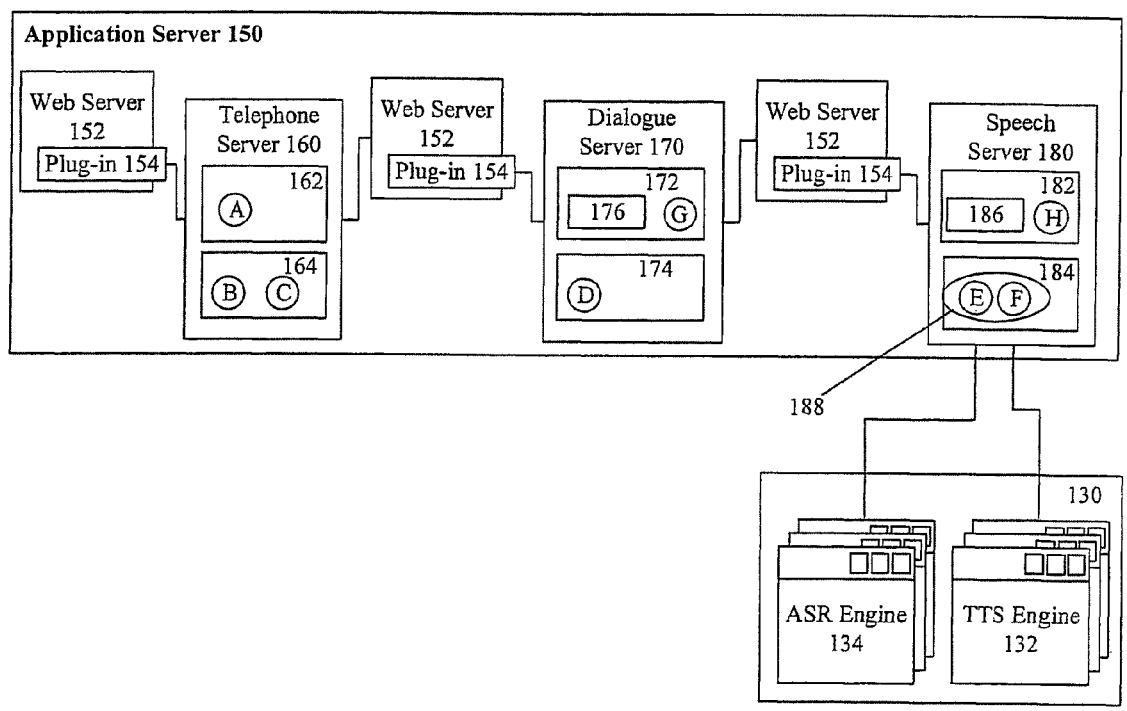
FIG. 1 is a schematic diagram illustrating a system including an application server that initializes stateful beans in accordance with the inventive arrangements disclosed herein.

FIG. 1 is a schematic diagram illustrating a system 100 including an application server that initializes stateful beans in accordance with the inventive arrangements disclosed herein. More specifically, in system 100, one or more stateful beans, including Beans B, C, D, E, and F can be instantiated within virtual machines of the application server 150 when the application server 150 starts. The initialized beans can be placed within a bean pool 188, where the stateful beans can be made available for handling requests. Servlets, such as servlet A, G, and H, can be included to execute preloading routines and other stateful bean related functions.

In one arrangement, the application server 150 can include one or more component servers, such as telephone server 160, dialogue server 170, and speech server 180, communicatively linked via one or more Web servers 152. Each Web server 152 can include one or more plug-ins 154, where each plug-in 154 can include routines for conveying data to particular component servers within the application server 150. In a particular arrangement, component servers of the application server 150 can also be distributed across a network. In such an arrangement, data can be conveyed to each of the component servers via the Web servers 152. The Web servers 152 can utilize Hypertext Transfer Protocol (HTTP) for compatibility with IP sprayers and firewalls.

The telephone server 160, the dialogue server 170, and the speech server 180 can be implemented as virtual machines, such as virtual machines complying with the J2EE specification. The telephone server 160 can control the setup, monitoring, and tear down of phone calls. In one arrangement, telephone server 160 can include web container 162 and bean container 164. In one embodiment, the telephone server 160 can include a call control servlet (servlet A), a call control bean (Bean B), and a call control interpreter bean (Bean C).

The dialogue server 170 can manage tasks relating to call dialogue for the application server 150. In one arrangement, the dialogue server 170 can include web container 172 and bean container 174. Moreover, the dialogue server 170 can include a voice markup interpreter bean (Bean D). The dialogue server 170 can also include a memory cache 176 for temporary storing data in order to speed up the execution of processes within the dialogue server 170.

The speech server 180 can handle one or more speech services for the application server 150. In one arrangement, the speech server 180 can include web container 182, bean container 184, and memory cache 186. Moreover, the speech server 180 can include speech engine interface beans. Each of the speech engine interface beans can be used to interface with a particular speech engine 130. For example, Bean E can be an automatic speech recognition (ASR) interface bean that interfaces with an ASR Engine 134. Bean F can be a text-to-speech interface bean that interfaces with a TTS engine 132.

In one embodiment, the bean container 184 can include a bean pool 188. The bean pool 188 can include instances of stateful beans that are available for handling requests. For example, one or more instances of Bean E and Bean F can be included within the bean pool 188. Each bean instance within the bean pool 188 can maintain an association with a particular speech engine 130. The handling of a request can involve removing a bean instance from the bean pool 188, using removed instance to interface with the associated speech engine 130 while the request is being handled by the associated speech engine 130, and releasing the bean instance back into the bean pool 188 once the speech engine 130 has finished handling the request. In one arrangement, the stateful beans E and F can be implemented as stateful session EJBs.

It should be appreciated that the application server 150 can be arranged in a multitude of fashions and that the invention is not to be limited to the illustrative arrangement presented herein. Further, the application server 150 can include any number of virtual machines, selective ones of which can be preloaded with stateful session EJBs. Different numbers of stateful session EJBs can be preloaded into different EJB containers of different virtual machines of the application server 150 as appropriate for performing operational tasks of the application server 150.

Moreover, the functionality attributable to the components of system 100 can be combined or separated in different manners than those illustrated herein. The components shown herein can also reside within different computing spaces than those illustrated. Additionally, a number of components can be utilized that have not been explicitly shown in FIG. 1.

For example, the telephone server 160, the dialogue server 170, and/or the speech server 180 can include a Java Connector Architecture (JCA) container (not shown). The JCA container can provide a well defined interface for components local to the application server 105. In one embodiment, the JCA container can function as an interface between beans within the EJB container 184 and components internal to the application server 105.

Figure 2:
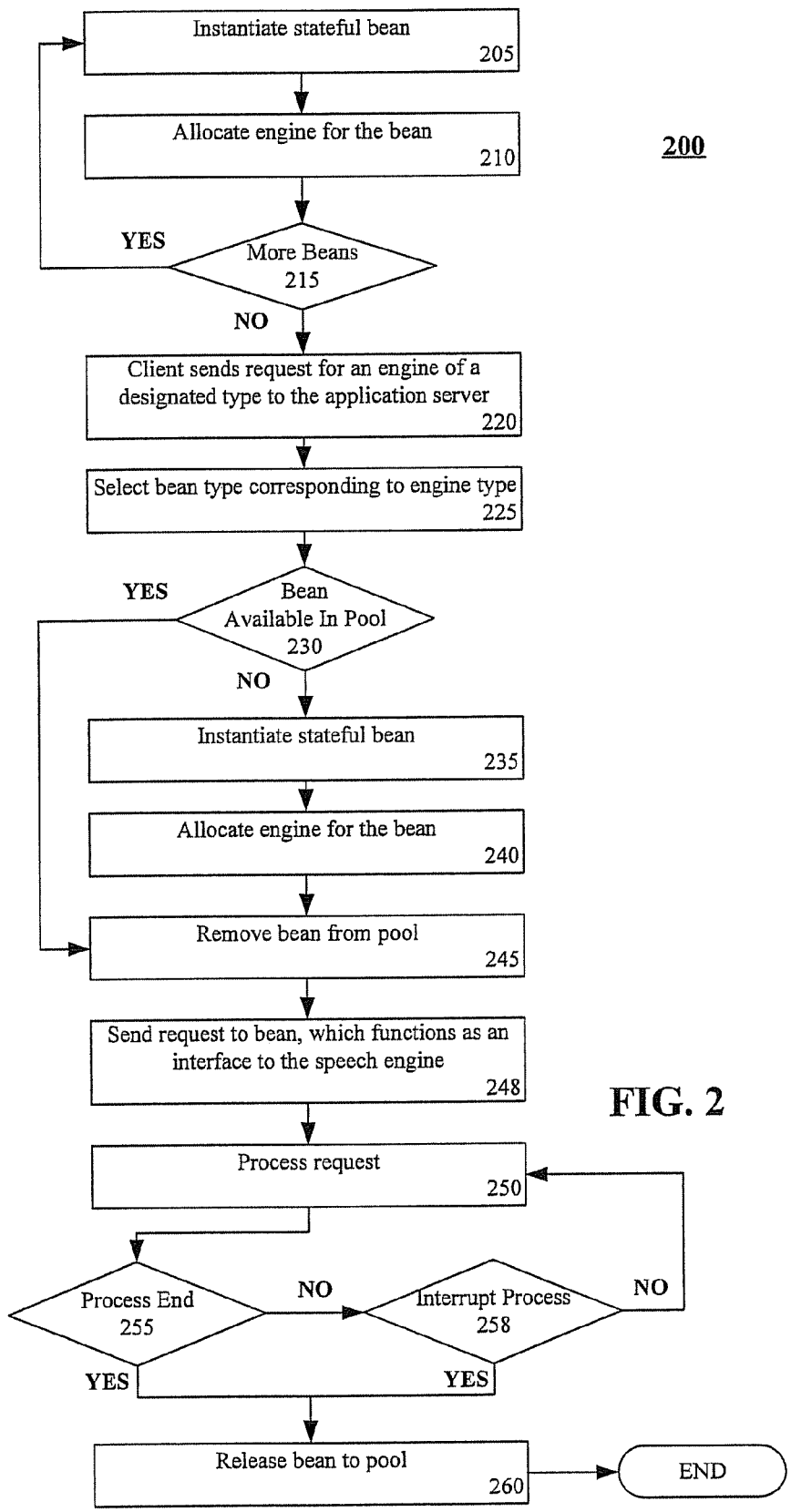
FIG. 2 is a flow chart illustrating a method for initializing stateful session EJBs in accordance with the inventive arrangements disclosed herein.

FIG. 2 is a flow chart illustrating a method 200 for initializing stateful beans in accordance with the inventive arrangements disclosed herein, where stateful beans can include stateful session EJBs as well as similar componentized executable software objects. The method can be performed in the context of an application server that includes one or more virtual machines, such as J2EE virtual machines. The virtual machine can include a bean container. Further, at least one engine, such as an ASR or TTS speech engine, remotely located from the application server can process tasks responsive to requests of the application server.

The method 200 can begin in step 205, where a stateful bean can be instantiated. In step 210, a remote engine can be allocated for the bean. Once allocated, a link can be formed between the stateful bean and the allocated engine, wherein the bean functions as an interface for accessing the associated engine. This link can remain stable for the duration of the session for which the stateful bean has been instantiated. That is, the stateful session bean can be associated with an engine while the bean is within the pool awaiting a request.

In one embodiment, the engine can remain occupied until the instance of the stateful bean expires. That is, the engine can be exclusively utilized by applications accessing the engine through the bean. In another embodiment, applications can access the engine via the stateful bean in a non-exclusive fashion. In such an embodiment, multiple instances of stateful interface beans can be associated with a single speech engine. Further, the application server accessing the speech engine via the interface beans can share the speech engine with other applications. Once a stateful bean has been initiated and linked to an allocated speech engine, that bean can be placed within a pool of available interface beans.

In step 215, a determination can be made as to whether more stateful beans are to be instantiated. If there are more stateful beans to instantiate, the method can loop to step 205. It should be appreciated that different types of stateful beans can be used to interface with different types of engines. For example, one type of stateful bean can interface with an ASR engine and a different type of stateful bean can interface with a TTS engine. The different types of stateful beans may not be interchangeable in particular embodiments. That is, the proper type of bean instance must be used to interface with a designated type of engine.

If no more stateful beans are to be instantiated, the method can proceed to step 220. In step 220, a client can send a request to the application server. The application server can utilize an engine of a designated type to perform at least one operation, thereby responding to the request. For example, when the request requires a text-to-speech conversion operation, the application server can utilize a TTS engine (accessed via a TTS interface bean) to respond. In another example, when the request requires a speech recognition operation, the application server can utilize an ASR engine (accessed via an ASR interface bean) to respond.

In step 225, a stateful bean instance of a type corresponding to the engine type can be selected. In step 230, a determination can be made as to whether an instance of the selected type of bean is available within the bean pool. If so, that bean instance can be removed from the bean pool. If no bean is available, the method can proceed to step 235, where a new stateful bean can be instantiated. In step 240, an engine can be allocated and linked to the bean instance. If there is a bean available in the pool in step 230, the method can proceed to step 245.

In step 245, the selected bean can be removed from the pool. In step 248, the request can be sent to the bean, where the bean can function as an interface to the speech engine. In step 250, the request can be processed. In step 255, if the process has ended, the method can proceed to step 260, where the bean can be released back into the bean pool. In step 255, if the process has not ended, the method can proceed to step 258.

The client and/or application server can interrupt the process before the process completes. In step 258, if the process is interrupted, the method can proceed to step 260, where the bean can be released back into the bean pool. If the process is not interrupted in step 258, the method can loop back to step 250, where the processing of the request can continue. After the bean has been released back into the bean pool in step 260, the method can end. Still, it should be appreciated that the method can loop back to step 200 to process further requests as may be required.

It should be noted that in one arrangement, the client of step 220 can be a remotely located client. As such, the stateful bean can be work load managed (WLM) as part of a load balancing strategy of the application server. Such an embodiment permits the method 200 to be utilized within a highly scalable solution.

FIG. 3 is expository pseudo-code for implementing a pool of stateful session EJBs in accordance with the inventive arrangements disclosed herein. The pseudo-code can be utilized in the context of an application server executing within a virtual machine having a bean container. The pseudo-code can be implemented as an extension of a session bean interface provided by the bean container.

In one embodiment, the virtual machine containing the bean container can include a J2EE virtual machine. In such an embodiment the pseudo-code shown in FIG. 3 can represent an extension of the EJB SessionBean interface provided by container javax.ejb.SessionBean. The EJB SessionBean interface can be extended to include a StatefulejbAcquire method, an instanceAcquired method, a releaseInstance method, and/or other similar or related methods.

The Statefulejb acquire method can be called in lieu of an EJB create method, when an instance of a stateful session EJB is needed to interface with a remote component, like an engine. The Statefulejb acquire method will acquire a stateful session EJB associated with an engine, whenever a suitable bean is available within the bean pool for use. When no suitable bean is available within the bean pool, a new stateful session EJB instance can be created. The new stateful session EJB instance can be associated with an appropriate allocated speech engine, where the EJB instance functions as an interface to the associated speech engine.

The instanceAcquired method can indicate whether a stateful session EJB is occupied. The instanceAcquired method can be called after a stateful bean instance has been retrieved from the bean pool. After the instanceAcquired method has been called, the stateful bean instance can be treated as though it has been removed from the bean pool.

The releaseInstance method can query a client to determine if a utilized stateful bean should be released back into the bean pool. Return values for the releaseInstance method can be Boolean values, with TRUE indicating a bean should be released and FALSE indicating a bean should not be released. In one embodiment, the releaseInstance method can be overloaded so that another form of the releaseInstance has a void return parameter. In such an embodiment, calling the releaseInstance method can result in the indicated stateful bean being released back into the bean pool.

It should be noted that the pseudo-code of FIG. 3 is presented for illustrative purposes only and that the invention is not to be limited to the embodiment shown in FIG. 3, but is instead to have a scope defined by the claims included herein. For example, the extended SessionBean interface can be further extended to include methods that get the number of currently available bean instances contained within the bean pool. Additionally, a destroy bean instance method and a create new bean instance method can be included within the SessionBean interface. Further, the SessionBean interface can be extended so that a type of stateful bean can be indicated, where different types of stateful interface beans can be used in a non-interchangeable fashion. For example, two types of interface beans can include a TTS interface bean and an ASR interface bean, where the TTS interface bean can be associated with a TTS engine, and where the ASR interface bean can be associated with an ASR engine.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. An application server interfacing system stored on a machine-readable storage medium, comprising:
    at least one engine configured to process requests for said application server; and
    a bean container configured to manage at least one stateful bean, said bean container comprising a bean pool, said bean pool configured to contain a multitude of stateful bean instances that are available for use upon demand, wherein each of the stateful bean instances is configured to operate as an interface for accessing an associated one of said at least one engine;
    wherein to create the bean pool and provide interfacing, the application server is configured to:
        instantiate at least one stateful bean;
        for each stateful bean instance, allocate an engine;
        associate each stateful bean instance with the allocated engine, each stateful bean instance operating as an interface for accessing the allocated engine; and
        add said each associated stateful bean instance to the bean pool so that said stateful bean instances in the bean pool are available for handling requests;
    receive a request for an engine from a client;
    select a stateful bean instance corresponding to the engine;
    retrieve a stateful bean instance from the bean pool if the stateful bean instance is available in the bean pool or instantiate a stateful bean, allocate the engine for a new stateful bean instance, and add the new stateful bean instance to the bean pool if the stateful bean instance is not available in the bean pool;
    convey the request to the retrieved stateful bean instance;
    process the request with the engine associated with the retrieved stateful bean instance; and
    release the retrieved stateful bean instance to the bean pool upon ending or interruption of the request processing.

2. The application server of claim 1, wherein said application server is configured to receive requests from at least one client, and wherein said application server utilizes a stateful bean instance to interface with a speech engine that is used to process the requests.

3. The application server of claim 1, wherein said application server is a speech server, said speech server executing within a virtual machine, and wherein said at least one engine is selected from a group consisting of an automatic speech recognition engine and a text-to-speech engine.

4. The application server of claim 1, wherein said bean container includes a public method called after a stateful bean is retrieved from the bean pool, said public method indicating that the stateful bean is occupied, and is therefore not available for handling new requests.

5. The application server of claim 1, wherein said bean container includes a public method called to release an instance of a stateful bean to the bean pool for reuse.

6. The application server of claim 1, wherein said bean container includes a public bean acquisition method, said acquisition method acquiring a stateful bean instance from the bean pool when at least one stateful bean is available for use, and wherein said acquisition method creates a new stateful bean instance when no stateful bean is available within the bean pool for use.

7. A machine-readable storage having stored thereon, a computer program having a plurality of code sections, said code sections executable by a machine for causing the machine to perform the steps of:
    creating a bean pool by the following steps:
        instantiating at least one stateful bean;
        for each stateful bean instance, allocating an engine;
        associating each stateful bean instance with the allocated engine, each stateful bean instance operating as an interface for accessing the allocated engine; and
        adding said each associated stateful bean instance to the bean pool so that said stateful bean instances in the bean pool are available for handling requests;
    receiving a request for an engine from a client;
    selecting a stateful bean instance corresponding to the engine;
    retrieving a stateful bean instance from the bean pool if the stateful bean instance is available in the bean pool or instantiating a stateful bean, allocating the engine for a new stateful bean instance, and adding the new stateful bean instance to the bean pool if the stateful bean instance is not available in the bean pool;
    conveying the request to the retrieved stateful bean instance;
    processing the request with the engine associated with the retrieved stateful bean instance; and
    releasing the retrieved stateful bean instance to the bean pool upon ending or interruption of the processing.

* * * * *